United States Patent
Greiner et al.

[11] Patent Number: 5,944,510
[45] Date of Patent: Aug. 31, 1999

[54] DYNAMIC FLUID INJECTOR

[76] Inventors: Leonard Greiner; David M. Moard, both of 3925 Vernon St., Long Beach, Calif. 90815

[21] Appl. No.: 08/742,383

[22] Filed: Nov. 1, 1996

[51] Int. Cl.[6] .............................. F23D 11/44; F23J 7/00
[52] U.S. Cl. ......................... 431/353; 431/216; 431/215; 431/8; 431/4
[58] Field of Search ............................. 48/144, 168, 108; 431/4, 8, 215, 216, 353

[56] References Cited

U.S. PATENT DOCUMENTS

| | | | |
|---|---|---|---|
| 4,988,287 | 1/1991 | Stegelman | 431/284 |
| 5,546,701 | 8/1996 | Greiner et al. | 48/108 |
| 5,664,943 | 9/1997 | Joos et al. | 431/8 |

FOREIGN PATENT DOCUMENTS 563793  3/1993  European Pat. Off. .

*Primary Examiner*—Donald E. Adams
*Assistant Examiner*—Joseph W. Ricigliano
*Attorney, Agent, or Firm*—Roger A. Marrs

[57] ABSTRACT

A fluid injector for use with a burner having at least a pair of concentric tubes which conduct at least two different fluids via inner and outer passageways to a discharge tip. The passageways having different linear fluid velocity rates which causes the issuing discharge flow of the fluids to constrict causing mixing and combining of the fluids for introducing to a combustion chamber. Protection of the injector from thermal melting or burning is provided by location of the injector within the coils of a feed preheater constituting a heat exchanger.

2 Claims, 4 Drawing Sheets

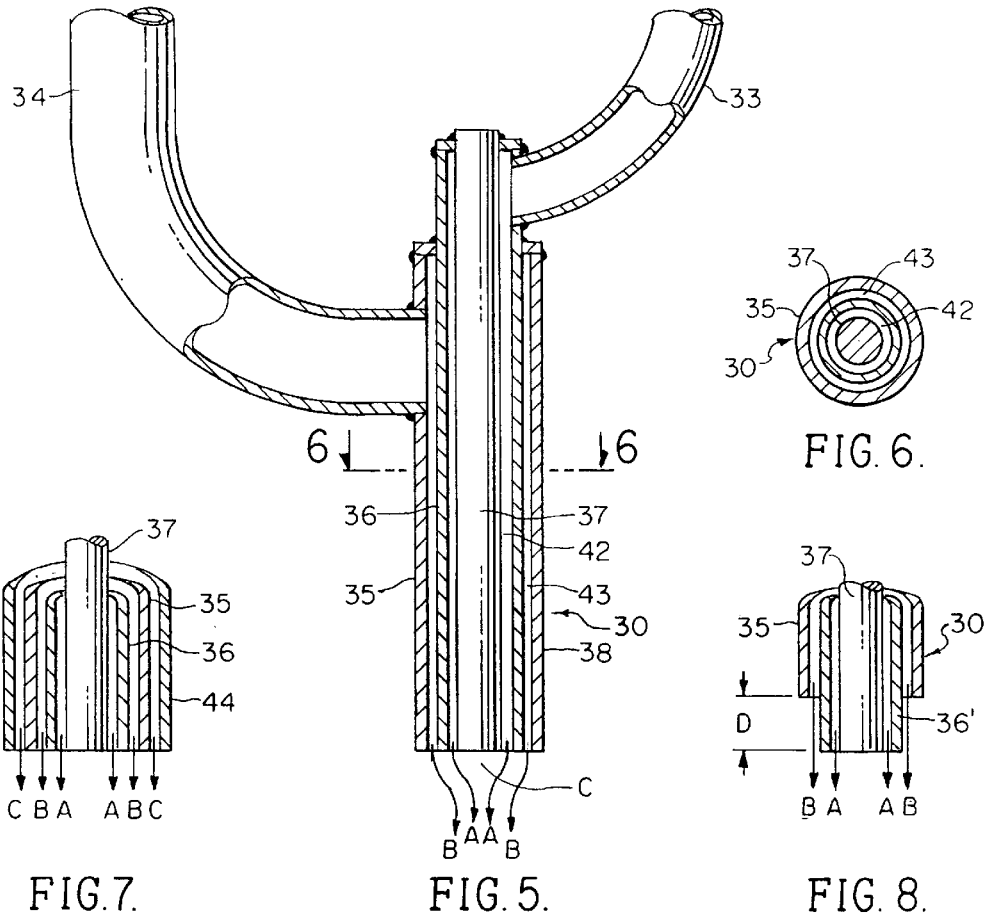
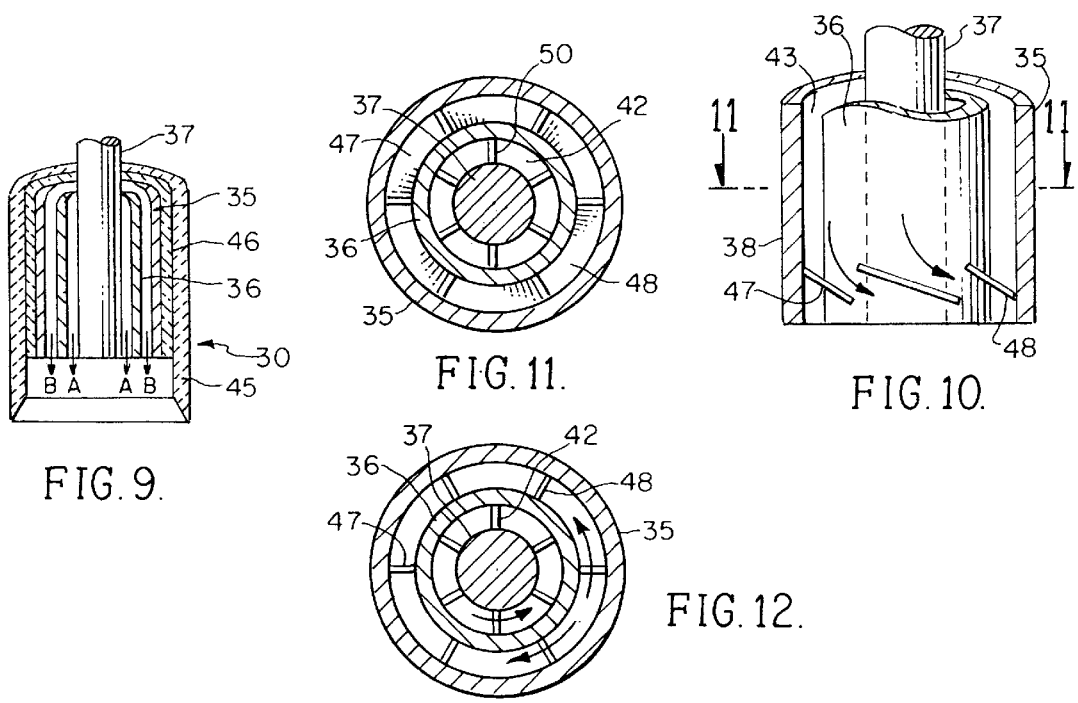

DYNAMIC FLUID INJECTOR

BACKGROUND OF THE INVENTION

1. Field of the Invention

The present invention relates to the field of injectors, and more particularly to a novel fluid injector device for combining and mixing at least two separate and different fluids within an enclosed chamber preparatory to and during combustion and for use with burners including underoxidized burners, in connection with fuel cells, internal combustion engines and the like.

2. Brief Description of the Prior Art

In the past, concentric streams of gaseous fuel and oxidizer in fluid form impinged onto a plate perpendicular to the flow of the streams which induces initial mixing. The design of the plate is such that the stream is directed rearward into the burner under conditions where further mixing occurs, as well as induction of the surrounding combustion products to provide internal circulation. The initial feed mixing produced in this manner is generally so rapid that chemical reaction between the fuel and oxidizer does not occur until the stream is no longer within a restricted enclosure so harmful results are avoided. Also, since combustion does not occur until mixing is complete, pockets with diverse air/fuel ratios cannot occur which, if near stoichiometric could lead to high temperatures with destructive effects or undesirable products. Previous injectors, as disclosed in U.S. Pat. Nos. 5,437,123 and 5,546,701 have been successfully used with air and methane feeds each at 1000° Fahrenheit, with vaporized liquid fuel feeds and air at 1000° Fahrenheit and with mixtures of CO, $H_2$, $N_2$ and air also at high temperatures, etc.

However, when the fluid feeds were methane as a fuel with augmented air consisting of a 50—50 mixture of oxygen and nitrogen, all preheated to 1000° Fahrenheit, unacceptable destruction occurred in the vicinity of the injector. Apparently, the extreme reactivity of these feed components at this condition resulted in ignition before the reactants completely mixed, so areas of near stoichiometric ratios occurred with temperatures high enough to cause destruction. Also, the injector tip was not protected against high temperature of the combustion.

Therefore, a long-standing need has existed to provide an improved injector which will minimize the above noted problems employing a modification in which one of the feeds induces the other feed external to the injector. This is broadly achieved by adjusting the diameters of the concentric tubes so that the velocity of feed in the one tube is about 1.25 times or twice that of the feed in the other tube. Such a treatment reduces or eliminates the need for a plate perpendicular to the flow in order to induce initial mixing. Also, protection of the injector tip from after surrounding gas high temperatures must be considered.

SUMMARY OF THE INVENTION

Accordingly, the present inventive dynamic fluid injector avoids the above-noted problems by adjusting the diameters of the concentric tubes carrying the liquid fluids to be mixed so that the velocity of the fluid feed in one tube is about 1.25 times that of the fluid feed in the other tube. Preferably, the fluids are conducted through the bores of concentric tubes of which one tube has a different diameter than the other and which terminate in a temperature protected tip. The induced mixed fluid feeds on exiting the injector continue as a single stream external to the injector whose aerodynamics cause its contraction to a smaller diameter which results in further mixing. The latter mixing is often acceptable even without the perpendicular downstream member shown in the previous patent and referred to as a plate perpendicular to the flow.

The inventive concept of the present dynamic fluid injector, in one form, includes a temperature protected injector tip acting as the terminus for an inner tube and an outer tube which are arranged in concentric spaced-apart relationship and wherein a solid rod may be disposed in the center of the smaller diameter tube. The respective fluid feeds, as augmented air and fuel such as methane, pass through the bores or annuluses of the tubes to exhaust or exit at the injector tip. The diameters of the inner and outer tubes and the solid rod are dimensioned so that the linear fluid feed flow rate in the inner annulus is about 1.25 times that of the feed flow in the outer annulus. The solid rod causes the fluid flow from the inner annulus to exit as an annulus. Fluid flow from the outer annulus moving from the injector tip is inducted into annual flow from the inner annulus. Because the flow from the inner annulus is an annulus that is not supported in its center, aerodynamic forces tend to cause its constriction to a thinner stream, which aids the mixing of streams from all the annuluses. If desired, the barrier serving as a perpendicular plate against which the streams impinge can be employed which would then cause a sudden 90° turn in the fluid flow which improves mixing and the rounded edges of the barrier cause the flow to move downward in a sheath which, through aerodynamic forces, result in a thinning of the flow that also increases mixing. However, it is to be understood that the plate or barrier is not critical to the mixing operation and procedure.

Temperature protection for the injector tip is achieved by its location inside a heat exchanger which preheats the feeds preparatory for mixing. The heat exchanger creates an inside area occupied by the injector of lower temperature than the area outside the heat exchanger.

Therefore, it is among the primary objects of the present invention to provide an improved fluid injector which employs the principles of induction for mixing at least two fluids preparatory for introduction to a combustion chamber.

Another object of the present invention is to provide an improved premixing injector for at least two different fluids whereby concentric streams of gaseous fuel and oxidizer employ aerodynamic principles which mix the different fluids together.

Another object of the present invention is to provide a novel premixing injector for different fluids wherein one of the fluid feeds to the injector inducts the other external fluid feed to the inductor whereby mixing occurs. The feeds are introduced to the tip of the inductor via concentric tubes in which the center tube may include a solid core.

Yet another object of the present invention is to provide a novel premixing injector having concentric tubes disposed about a central core in fixed spaced-apart relationship so as to define at least a pair of annuluses wherein linear flow rates within the inner annuli are about 1.25 times that of the outer annulus thereby inducted mixed fluid feeds on leaving the injector continue as a single stream external to the injector.

Another object resides in injector protection from high temperatures by placement of the injection within coils of a heat exchanger that preheats the feed whereby the high temperature about the heat exchanges is drawn off to reduce temperature at the injector.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 5 is a view similar to the view of FIG. 2 illustrating the novel injector for mixing fluids without a barrier or perpendicular plate for causing reverse flow;

FIG. 6 is a transverse cross-sectional view of the injector shown on FIG. 5 as taken in the direction of arrows 6—6 thereof;

FIG. 7 is a sectional view of the tip of an injector illustrating the use of induction principles for mixing at least three fluids;

FIG. 8 is a sectional view of another embodiment illustrating that the length of concentric tubes may be different in length;

FIG. 9 is a sectional view of the tip of an inductor showing the discharge of the annuluses from the concentric tubes passing through a shroud;

FIGS. 10 and 11 are sectional views of another embodiment of the invention illustrating the use of baffles in the annuluses of the concentric tubes for directing fluid flow at the tip of the injector;

FIG. 12 is a transverse cross-sectional view of the embodiment shown in FIG. 10 and 11 illustrating the counter locational flow of fluids in the annuluses preparatory for discharge from the injector tip;

DESCRIPTION OF THE PREFERRED EMBODIMENT

Figure 1:
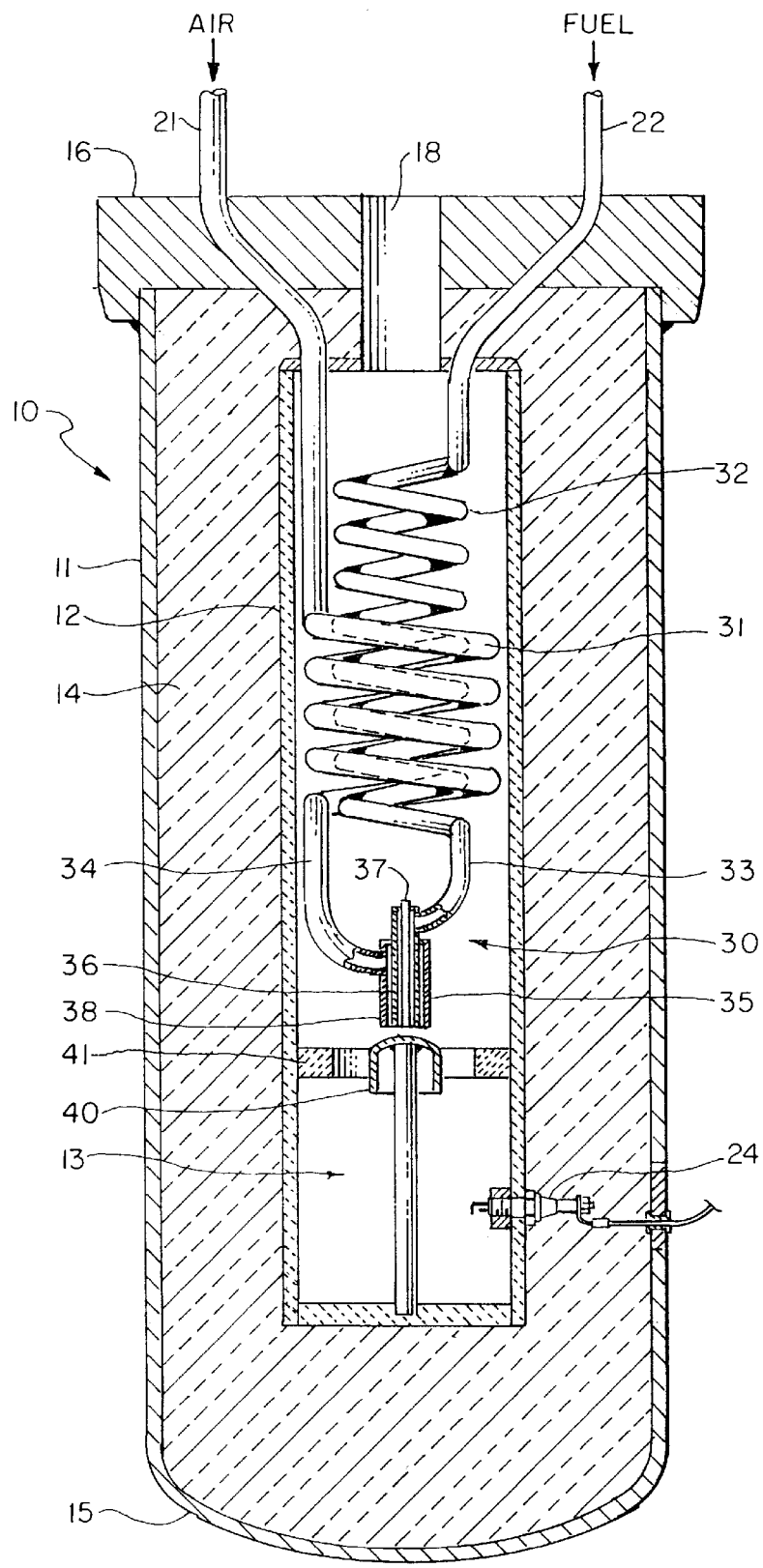
FIG. 1 is a longitudinal cross-sectional view of an underoxidized burner, as an example, incorporating the dynamic fluid injector of the present invention.

Referring to FIG. 1, an underoxidized burner is illustrated in the general direction of arrow 10 which is discussed in previous patents, such as U.S. Pat. Nos. 5,437,123 and 5,546,701. It is to be understood that the improved injector of the present invention may be employed in conjunction with other structures, such as fuel cells, internal combustion engines or the like, and that the employment in an underoxidized burner is by way of example and usage.

In such a burner 10, an elongated cylinder 11 is employed which includes a cement jacket 12 that defines an internal combustion chamber 13. Between the outer shell of the cylinder 11 and the jacket 12, there is an insulative material 14 which completely surrounds the jacket 12. One end of the cylinder is closed at bottom 15 while the opposite end is closed by a plug 16 welded to the cylinder 11. A plug 16 is at end 18 of the combustion chamber 13 and through which inlet tubes 21 and 22 conduct different substances such as air and fuel respectively into the cylinder 11 by an injector 30. The cylinder may be a pressure vessel and gases within the combustion chamber 13 are ignited by means of a conventional sparkplug 24 as illustrated and its spark ignites to reach the gases within the chamber 13.

The novel injector of the present invention is illustrated in the general direction of arrow 30 within the combustion chamber and the inlets 21 for air and 22 for fuel are connected to coils 31 and 32, respectively, which serve as heat exchangers for preheating the air and fuel as they are introduced to the injector 30. It is to be particularly noted that the preheating heat exchanger or coils are arranged in coaxial relationship. The opposite end of each of the respective coils is connected to the injector via intermediate tube 33 for the fuel tube or coil 32 and the other intermediate tube 34 for the coil 31.

It can be seen that the injector 30 includes three components which take the form of a pair of coaxial tubes 35 which is an outer tube and an inner tube 36 as well as the optional use of a central core 37 that is disposed within the bore of the inner tube 36. All of the components are arranged in fixed spaced-apart relationship so that a pair of annuluses are provided between the opposing surfaces of the tubes and cores through which the respective air and fuel will be carried to the tip 38 of the injector 35. After discharge of the air and fuel from the tip of the injector, the mixing occurs through constriction by aerodynamic forces and the mixture may be introduced to the curved face of a barrier 40 as well as to a ceramic ring 41. The barrier and ceramic ring are disclosed in previous U.S. Pat. No. 5,529,484.

Figures 2, 4:
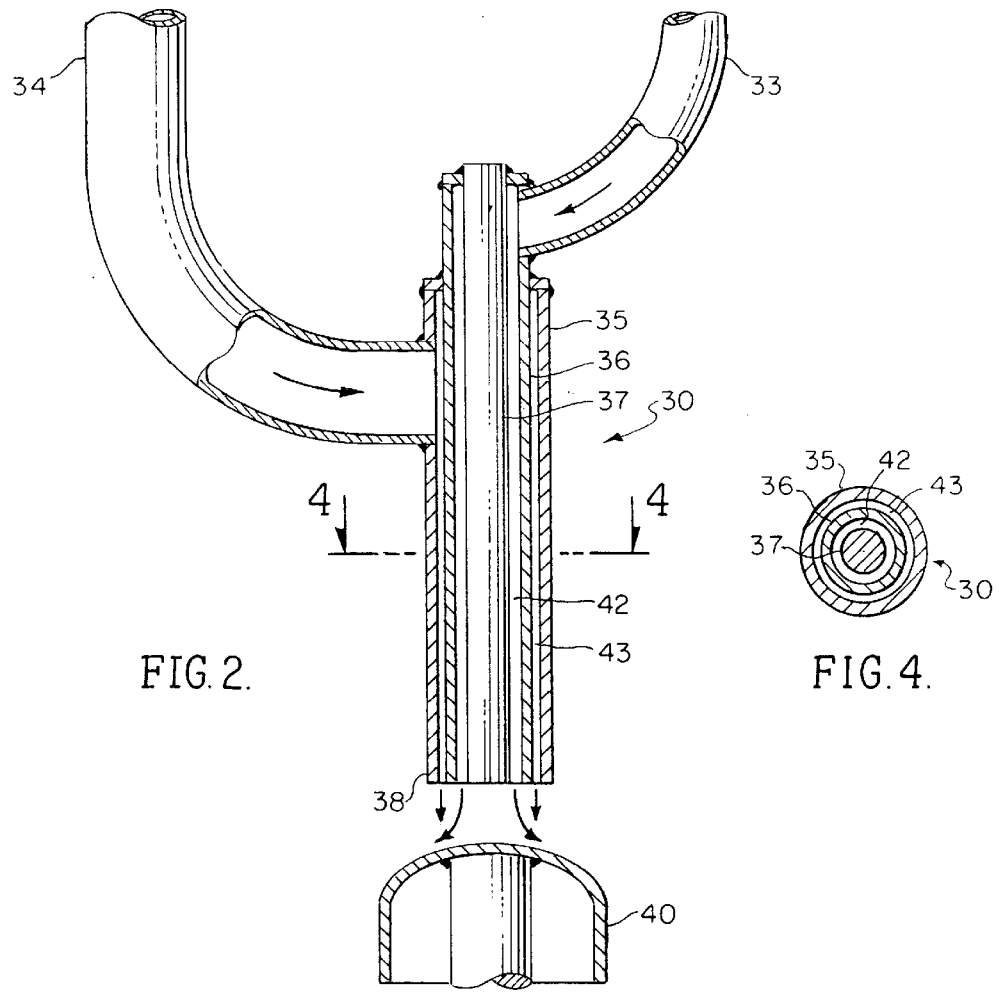
FIG. 2 is an enlarged sectional view of the dynamic fluid injector show in FIG. 1.
FIG. 4 is a transverse cross-sectional view of the injector shown in FIG. 2 as taken in the direction of arrows 4—4 thereof.

Referring now in detail to FIGS. 2 and 4, numeral 38 represents the tip of the injector and numeral 35 represents the outer tube while numeral 36 represents the inner tube and numeral 37 indicates a solid rod which is disposed in the center of the inner tube 36. The inner and outer tubes are coaxially disposed with respect to one another and the inner tube 36 includes a bore into which the core 37 is disposed in fixed spaced-apart relationship with respect to the inner surface of the tube bore. By arranging the coaxial tubes and concentric tubes in spaced-apart relationship, their respective bores provide annuluses 42 and 43. Linear flow through annulus 42 is about 1.25 times the flow rate of the outer annulus 43. Annulus 42 which is the inner annulus carries the fuel from tube 33 to the tip of the injector for discharge towards the barrier 40. The outer annulus 43 carries the air or oxidizer from tube 34 to the tip 38 of the injector for discharge in conjunction with the fuel discharge from inner annulus 42. When the fuel and air are ready for discharge from the injector, the substances have been preheated by the coaxial coils 31 and 32 constituting the heat exchanger and any enclosed liquids have been vaporized preparatory for discharge from the injector. The oxidizer may take the form of augmented air and fuel may take the form of a natural gas, methane gasoline, diesel fuel or any other suitable substance. The respective vapor feeds pass through the annuluses 42 and 43. Barrier 40 with rounded edges causes the impinging mixed flow to divert in a curvalinear manner that increases mixing to the combustion chamber 13 as has been discussed in the previously noted patents.

The diameters of the tubes 35 and 36 and the rod 37 are such that the feed flow rate in the inner annulus 42 is about 1.25 times that of the feed flow in outer annulus 43. The core or rod 37 causes the flow from outer annulus 43 to exit as a circular toroidal annulus. The flow from inner passageway or annulus 42 exits as a toroidal annulus. The outer flow 43 leaving the injector tip is inducted into the annular inner flow 42. Because the flow from the passageway 42 is an annulus that is not supported in its center, aerodynamic forces tend to cause its constriction to a thinner stream which aids the mixing of streams discharging from the passageways 42 and 43. This occurs whether the core 37 is employed or not. As discussed in previous patents noted above, the barrier 40 causes a sudden shift or turn in the direction of flow which improves mixing and its rounded edges cause the flow to move downward in a sheath which through aerodynamic forces, results in a thinning of a flow that also increases mixing. However, it is to be understood that the barrier 40 need not be used as will be described later with respect to the embodiment shown in FIG. 5.

Figure 3:
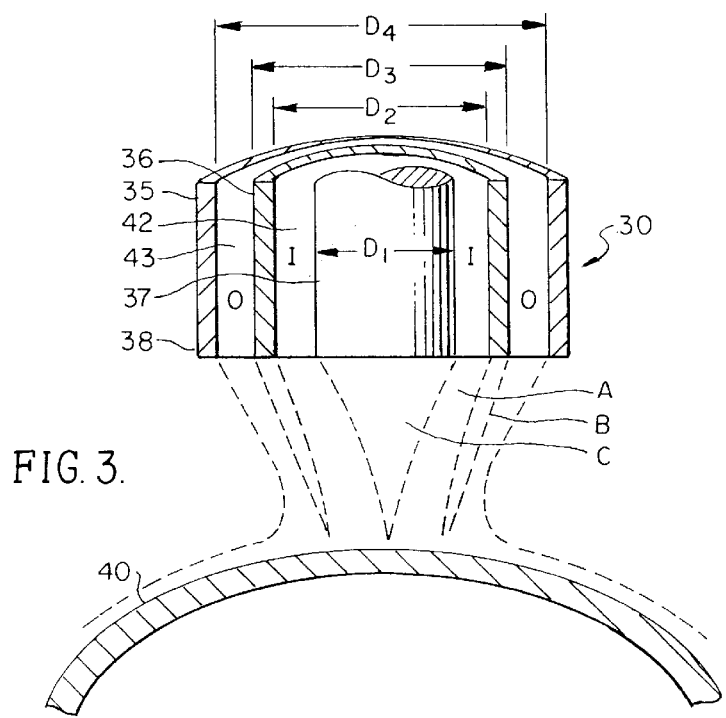
FIG. 3 is a greatly enlarged sectional view illustrating the tip of the injector and the mixing of fluids employing induction principles.

Referring now in detail to FIG. 3, an enlarged view of the tip 38 of the injector 30 is illustrated in which the air or oxidizer fluid flow now in vapor form is in the outer passageway "O" which may be defined as an annulus. The fuel flow now in vapor form is in the inner passageway "I" representing an annulus and the discharge from the two annuluses "O" and "I" discharge from tip 38 in streams represented by stream "A" and stream "B" defined between the broken line showing. It is to be particularly noted that the stream "A" converges about the core 37 as it leaves the tip and similar effects cause stream "B" to contract and thereby induct into stream "A" so as to cause the two vapors to mix. The use of the core 37 and/or barrier 40 aids or augments the mixing but is not necessary since combining and mixing of the vapors occurs immediately upon discharge from the tip 38 of the injector.

In furtherance of FIG. 3, dimensions are proposed for the concentric injector employed in the underoxidized burner shown. The following represents a mathematical equation of the dimensions of the concentric-tube injector and the dimensions considered are described by the letter notations in FIG. 3 and the various symbols which are referred to herein. The equation determines the diameter of the center solid core for selected dimensions of the annuluses, as needed to provide the desired ratio, R, of the linear flow rates in annuluses "I" and "O". A minimum ratio of about 1.25 is needed.

R=Desired ratio of linear flow rates in annulus "I" vs. "O"

FO=Flow rate in annulus "O" in SCFH

FI=Flow rate in annulus "I" in SCFH

TO=Absolute temperature in annulus "O" in degrees Rankine

TI=Absolute temperature in annulus "I" in degrees Rankine

PI=Absolute pressure in annulus "I" in psia

PO=Absolute pressure in annulus "O" in psia

RA=Calculated ratio of areas in annulus "O" vs. "I"

$$RA=R\ (FO/FI)\ (TO/TI)\ (PO/PI) \quad (1)$$

If RA is less that 1 the inner rod 37 diameter is less than zero. Since this is not practical, a higher value of "R" must be chosen.

Then, diameter of the inner rod 37 is determined using equation (2).

$$D1=[RAx(D3-2xT)^2-(D4^2-D3^2)/RA] \quad (2)$$

Experiments made using these dimensional examples show that gas flow that leaves the outer annulus "O" is virtually completely sucked into the gas flow that leaves the inner annulus "I" with minor change in the diameter of the latter inner gas stream "A". Aerodynamic effects cause stream "A" to converge. The consequence is mixing by a constricting action.

Referring now in detail to FIG. 4, a transverse cross-sectional view is shown wherein it can be seen that the inner annulus 42 is about 1.25 times the linear flow rate of the outer annulus 43. Mixing of the vapors in the annuluses occurs when the vapors are no longer in the restrictive enclosure of the concentric tubes. In the present example, the speed of the two vapor streams is adjusted by the diameter (area) of the annuluses since they are different. By controlling the diameter of the passageways or annuluses, speed of flow is controlled. Immediately beyond the tip 38 of the injector, the combining and mixing area may be referred to as a thinning area and the space immediately ahead of the injector tip 38 represents a low pressure area as indicated by the letter "C" in FIG. 3. The fuel vapors and oxidizer of air vapor may be heated to approximately 1000° Fahrenheit when the vapors are in the injector 30. The coils 31 and 32 serve as preheaters for the fluid and combustion in the chamber 13 causes the heat exchange from the combustion chamber to heat the fluids preparatory for introduction to the injector 30. The fuel used may be methane, diesel, gasoline or any hydrocarbon which can be vaporized. Chemical reaction between the vapors is avoided in the initial mixing because of the speed of discharge within area "C". Mixing occurs when the fuel and oxidizer vapors are no longer in the restricted enclosure of the injector 30.

Referring now to FIGS. 5 and 6, another embodiment of the invention is illustrated wherein the barrier 40 is eliminated as the barrier is not necessary to combine and mix the vapors exiting from the injector tip 38. The vapor streams, as described in FIG. 3, are illustrated and it can be seen by the direction of the arrows that the inner annulus or stream "A" reduces in diameter as it leaves the core 37 which permits contraction of the stream "B" from the outer annulus in passageway 43. Since the speeds of the vapor discharge of the streams are different, combining and mixing ensues as previously described. Also, it is to be understood that the ceramic ring, as identified by numeral 41 in FIG. 1, is not required to achieve the combining and mixing relationship of the vapors.

It can be seen in FIGS. 5 and 6 that the extreme end of tubes 35 and 36 terminate in a flush relationship at the injector tip 38. Neither of the two tubes extends beyond the other. However, it is to be noted in FIGS. 7 and 8 that additional concentric tubes can be provided for an additional introduction of another fluid such as water as an example. In FIG. 7, the third fluid is discharged and it represented by the letter "C" in a stream simultaneously with the streams "A" and "B".

FIG. 8 illustrates means to protect the injector tip from being harmed by the high temperature environment. While normally this is accomplished by cooling derived from the internal flowing feed, when this is inadequate, other means can be used as next discussed.

FIG. 8 is a schematic of one such means. In it, 30 represents the concentric injector. However, the outer tube is shortened by length "D", with the discharged feed exposed to the surrounding area. Aerodynamic forces cause the exposed feed to cling to the injector. As a result, its flow does not vary greatly from its condition when in the annulus, as long as the dimension "D" is between about 0.3 to 5 times the outside diameter of the outer tube.

The exposed feed flow protects the injector tip from the high temperatures in the burner by decreasing normal thermal transfer to the inner metal tube, and by preventing the tip from acting as a flame holder that would greatly increase heat transfer. Also, because the exposed feed has a reduced linear velocity than it did when bound by the external tube, the ratio of its velocity to that in the center annulus is less likely to exceed that of the effluent from the inner annulus. If this occurs, the outer flow will be inducted into the feed flowing in the inner annulus, which is a principal requirement of the concentric injector to effect mixing of the two.

In furtherance of FIG. 8, it can be seen that the outer tube 35 is of shorter length than the tip of inner tube 36. Thus, not only can adjustment be made to include additional fluid mixture to "A" and "B" streams but the speed and discharge relationship of the vapors can be adjusted by increasing or decreasing the tip point of the respective injector tubes 35 and 36. The extended portion of the inner tube 36 is identified by numeral 36 and the portion extends beyond the terminal length of the tube 35.

FIG. 9 is another means wherein 30 represents the concentric injector having a surrounding sheath 46 of fibrous insulation (such a Pryolab wet sheet), and the latter is enclosed in cylinder 45 of solid ceramic (as silicon dioxide). The outer cylinder protects the metal injector from exposure to high temperature, and the fibrous insulation, which is springy in nature, permits the metal injector to expand without harming the ceramic cylinder, which expands very little.

The injector is illustrated wherein the cylinder or shroud 45 is placed about the injector tip so that the discharge of streams "A" and "B" will be partially contained within the cavity of the shroud 45 during initial discharge which augments the combining of the vapor particles during the mixing procedure. The shroud 45 may be separated from the outer tube 35 by the insulator material 46. The discharge of the streams is as previously described with respect to FIG. 3.

Still another embodiment of the invention is illustrated in FIGS. 10, 11 and 12 wherein a series or an array of baffles are placed within the passageways or annuluses in order to place a spin on the flow of the vapors through the respective chambers. As illustrated, the baffles 47 and 48 are placed in the outer passageway or annulus 43 so that the oxidizer or air in passageway 43 will strike the baffles and follow the direction of the arrows preparatory for discharge from the tip 38. As shown more clearly in FIGS. 11 and 12, baffles 50 are included in the reduced passageway or annulus 42 so that the vapor stream in the inner annulus will spin as well. In FIG. 12, it can be seen that the baffles in the respective passageways or annuluses can be arranged to produce a contra rotating vapor stream within the respective passageways.

Figure 13:
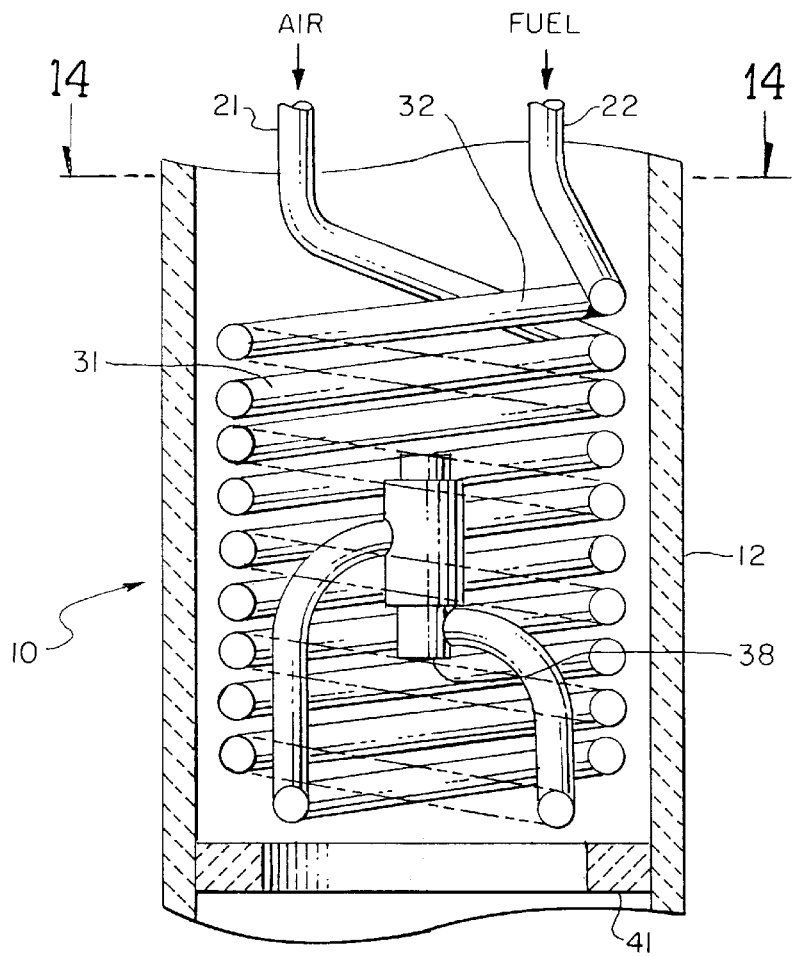
FIG. 13 is a fragmentary sectional view of another version of the invention illustrating preheating of the fluid preparatory for entering the concentric tubes of the injector.
Figure 14:
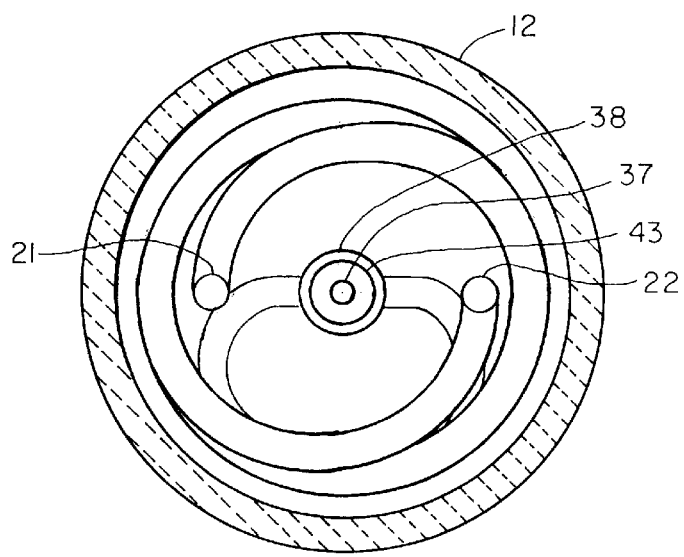
FIG. 14 is a transverse cross-sectional view of the heat exchanger and injector as taken in the direction of arrows 14—14 of FIG. 13.

Referring to FIGS. 13 and 14, another embodiment of the present invention is illustrated wherein it can be seen that the heat exchanger coils 31 and 32 are arranged in coaxial relationship. In the center of the coils of the heat exchanger, the injector of the present invention is disposed and terminates in the tip 38, as previously described. It can also be seen that the inlet port 21 for the air or oxidizer passes the fluid through the coil 31 and introduces the vapors directly to the outer annulus or passageway 43. On the other hand, the fuel introduced through inlet port 22 to the other coil 32 passes through the center of the heat exchanger coil arrangement or assembly for introduction to the inner annulus or passageway 42.

Also, it is to be noted that the ceramic ring 41 is disposed immediately below the last coil so that the discharge from tip 38 and the annuluses will be directed through the opening in the center of the ceramic ring 41. The location of the ceramic ring 41 is helpful in obtaining maximum efficiency of the combustion procedure.

As shown in FIG. 13, the tip is located within the coils of the heat exchanger. Because the latter removes thermal energy from gases, the tip 38 is in a lower temperature environment than described above which is even more conducive to longer life.

As an example of how the tip 38 is maintained at a lower temperature, consider the mixed gaseous vapors from the injector being combusted in chamber 13 up to 2900° F. and being reversed in flow direction after impacting against the end of the cylinder over the preheating coils 31 and 32. Heat is transferred from the reversed flow to the coils for preheating the oxidizer and fuel so that the gaseous flow is about 1800° F. at the exhaust or chamber end 18 of the chamber. This exchange prevents the higher temperature gases from super or over heating the injector. The temperature progressively reduces from about 2900° F. at the exhaust end 18. This protects the injector and especially the tip 38 from burning or melting.

In view of the foregoing, it can be seen that the dynamic fluid injector of the present invention provides a novel combining and mixing of different vapors within a combustion chamber and wherein the vapors are preheated prior to discharge from the injector. The injector is efficient for at least two different substances or gases and efficiency is improved according to application requirement by using the variety of versions, as shown in the drawings.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A concentric tube injector comprising:

at least a pair of concentric tubes arranged with a first tube disposed within a second tube in fixed spaced-apart relationship therewith;

a solid core disposed in said first tube in fixed spaced-apart relationship therewith;

space defined between said first tube and said second tube constituting an outer annulus and with space defined between said first tube and said core constituting an inner annulus;

said outer annulus having a fluid carrying area of greater volume than the fluid carrying volume of said inner annulus so that a speed differential is provided;

means operably coupled to said second tube in fluid communication with said outer annulus for introducing a first pressurized fluid thereto and coupled to said first tube in fluid communication with said inner annulus for introducing a second pressurized fluid thereto;

said pair of concentric tubes each having a first closed end and a second open end which terminates in a discharge tip for discharging said first and said second pressurized fluids exteriorly of said inner and said outer annuluses to disperse, combine and mix by constricting action about said core due to a difference in the speed of fluid travel of said first and said second pressurized fluids; and said pair of concentric tubes are of different lengths wherein said first tube is longer in length at said discharge tip than the length of said second tube.

2. A concentric tube injector comprising:

at least a pair of concentric tubes arranged with a first tube disposed within a second tube in fixed spaced-apart relationship therewith;

a solid core disposed in said first tube in fixed spaced-apart relationship therewith;

space defined between said first tube and said second tube constituting an outer annulus and with space defined between said first tube and said core constituting an inner annulus;

said outer annulus having a fluid carrying area of greater volume than the fluid carrying volume of said inner annulus so that a speed differential is provided;

means operably coupled to said second tube in fluid communication with said outer annulus for introducing a first pressurized fluid thereto and coupled to said first tube in fluid communication with said inner annulus for introducing a second pressurized fluid thereto;

said pair of concentric tubes each having a first closed end and a second open end which terminates in a discharge tip for discharging said first and said second pressurized fluids exteriorly of said inner and said outer annuluses to disperse, combine, and mix by constricting action about said core due to a difference in the speed of fluid travel of said first and said second pressurized fluids; and a third tube concentric about said pair of concentric tubes having a first closed end and a second end terminating at said discharge tip, said third tube placed in spaced-apart relationship with respect to said second tube to define a third annulus for conducting a third pressurized fluid exteriorly of said inner and outer annuluses to disperse, combine and mix by constricting action said third pressurized fluid with said first and second pressurized fluids.

* * * * *